United States Patent
Ohzeki et al.

[11] Patent Number: 6,084,733
[45] Date of Patent: Jul. 4, 2000

[54] STORAGE DEVICE AND ERROR RECOVERY METHOD EXECUTING A PLURALITY OF ERROR RECOVERY ROUTINES BASED ON ERROR TYPE

[75] Inventors: Hideki Ohzeki, Yokohama; Akira Kibashi, Zama; Hiromi Nishimiya, Sagamihara; Takahiro Saitoh, Yokohama, all of Japan

[73] Assignee: International Business Machines Corporation, Armonk, N.Y.

[21] Appl. No.: 08/958,605

[22] Filed: Oct. 27, 1997

[30] Foreign Application Priority Data

Oct. 25, 1996 [JP] Japan .................................. 8-283831

[51] Int. Cl.[7] ................................ G11B 5/09; G11B 3/90
[52] U.S. Cl. ............................................ 360/53; 369/53
[58] Field of Search .......................... 360/46, 53; 369/53; 395/182.03; 371/40.14

[56] References Cited

U.S. PATENT DOCUMENTS

| | | | |
|---|---|---|---|
| 5,371,742 | 12/1994 | Brown et al. | 371/7 |
| 5,721,816 | 2/1998 | Kusbel et al. | 395/182.13 |
| 5,754,355 | 5/1998 | Nakamura et al. | 360/53 |
| 5,812,752 | 9/1998 | Yamada | 395/182.03 |

*Primary Examiner*—W. Chris Kim
*Attorney, Agent, or Firm*—G. Marlin Knight

[57] ABSTRACT

A storage device is described which has a plurality of different error recovery routines which are are divided into groups. When an error occurs, specific routines are selected from the groups in accordance with the error type. The selected routines are executed in order. By preferentially executing the selected routines corresponding to the error type, the error recovery rate in the early stages of the error recovery procedure is enhanced.

12 Claims, 4 Drawing Sheets

| Step No. | Group | Step | Address | Corresponding error |
|---|---|---|---|---|
| 1 | | SYNC 1 | 6E44 | ALL |
| 2 | | SYNC 2 | 6E48 | |
| 3 | | Off-track 1 | 6E4C | |
| 4 | | Off-track 2 | 6E50 | |
| 5 | A | AGC Hold | 6E54 | TA |
| 6 | | Data Threshold Adjustment | 6E58 | Servo error |
| 7 | | Servo Threshold Adjustment | 6E5C | Misread |
| 8 | B | Butterfly seek | 6E60 | TA |
| 9 | | Off-track seek | 6E64 | Servo error |
| 10 | | MR BIAS change | 6E68 | Misread |
| 11 | C | Fly height change | 6E6C | TA |
| 12 | | ECC correction | 6E70 | Servo error |
| 13 | | Dummy write | 6E74 | Misread |
| • | • | • | • | • |
| • | • | • | • | • |
| • | • | • | • | • |

| Step No. | Group | Step | Address | Corresponding error |
|---|---|---|---|---|
| 1 | | SYNC 1 | 6E44 | ALL |
| 2 | | SYNC 2 | 6E48 | |
| 3 | | Off-track 1 | 6E4C | |
| 4 | | Off-track 2 | 6E50 | |
| 5 | A | AGC Hold | 6E54 | TA |
| 6 | | Data Threshold Adjustment | 6E58 | Servo error |
| 7 | | Servo Threshold Adjustment | 6E5C | Misread |
| 8 | B | Butterfly seek | 6E60 | TA |
| 9 | | Off-track seek | 6E64 | Servo error |
| 10 | | MR BIAS change | 6E68 | Misread |
| 11 | C | Fly height change | 6E6C | TA |
| 12 | | ECC correction | 6E70 | Servo error |
| 13 | | Dummy write | 6E74 | Misread |
| ⋮ | ⋮ | ⋮ | ⋮ | ⋮ |

*FIG. 2*

| Error type | Offset 1 | Offset 2 |
|---|---|---|
| TA | 0 | 3K |
| Servo error | K | 2K |
| Misread | 2K | K |

*FIG. 4*

STORAGE DEVICE AND ERROR RECOVERY METHOD EXECUTING A PLURALITY OF ERROR RECOVERY ROUTINES BASED ON ERROR TYPE

FIELD OF THE INVENTION

The present invention relates to the field of error processing in a storage device. More specifically, the invention relates to a method of realizing the optimum execution form of an error recovery procedure (ERP) and an apparatus for carrying out the method.

BACKGROUND OF THE INVENTION

A disk drive unit records data on tracks formed on a disk and also reads the recorded data from the disk tracks. The read/write head with signal transducer is positioned over a desired position on the data recorded track so that data can be written to or read from the track. When an error occurs as data is written to or read from the track with the read/write head(s), an error recovery procedure (ERP) including a variety of error recovery routines is used to recover the error.

On the disk a read error occurs due to various causes, such as scratches on the disk, non-homogeneity in magnetic material, and a specular change in magnetic material. With respect to errors occurring in data, an error-detecting/correcting code (ECC) is usually used to execute error recovery processing. Furthermore, various recovery procedures, such as a change in a reading gain, a change in an off-track, and a change in the bias value of a magneto resistance (MR) element in the case where the MR element is used as a read head, are executed. If data is again read out after execution of an error recovery procedure such as this and the data reading operation is successful, the data will continue to be used. When an error can not be recovered by a plurality of error recovery procedures, the error is processed as a hard error. If it is possible to reassign data to another region on the disk, an error detected region on the disk will be processed as a unusable region, and reassignment of data to another region will be performed.

In many of recent disk drive units, MR heads have been employed. The MR head measures an output resistance which varies as a magnetic flux varies. By allowing a predetermined current to pass through an MR element, resistance change is converted to a dc voltage signal and data is read out.

However, in the method of reading the resistance change, a thermal asperity error may occur as one of the read errors. The thermal asperity error means that resistance change occurs due to a change in the temperature of an MR element caused when a read head impinges on asperities on a disk. The resistance change causes an abnormal signal to occur.

As a recovery method against thermal asperity errors, there is a method of shaving off the asperities on a disk, which cause the thermal asperity error, by varying the rotational speed of a disk spindle so that the fly height of a magnetic head is varied. This method is also constituted as one of the routines of the aforementioned error recovery procedure (ERP).

There are various methods to recover errors caused when data is read or written, but these are usually stored as a sequence of routines of the error recovery procedure. If the error recovery procedure is started, these routines will be executed in sequence.

It cannot be said that the primary factor of the occurrence of errors is permanently the same, and various primary factors can arise. Therefore, an error recovery procedure is required which is compatible with these various error factors. Generally the error recovery procedure changes and adjusts each one of the standard reading conditions determined between a disk, a magnetic disk, and a hard-disk controller (HDC) and then executes a read operation again. The reading conditions are, for example, (1) an off-track quantity which is an offset quantity between the center of the magnetic head and the center of the track, (2) a bias current value given to an MR element in the case where a magnetic head is equipped with the MR element, (3) adjustment of automatic gain control (AGC) for making the amplitude of a reconstruction signal constant, (4) speed adjustment of a phase-locked loop (PLL) circuit for stabilizing a sampling frequency (a follow-up speed is adjusted to a predetermined speed), etc.

A plurality of error recovery routines are usually registered as an error recovery procedure (ERP). These routines are executed in a predetermined order. A Retry (rereading) is preferred after each routine ends, and if the retry is successful, the error recovery procedure ends. If the retry is unsuccessful, the error recovery procedure will end at the time the retry has reached the maximum number of retries or at the time the last step of the error recovery procedure has ended. In this error recovery procedure including a plurality of different error recovery routines, the execution order is fixed. For example, adjustment of AGC is first performed. Then, adjustment of a PLL circuit is performed. Next, the bias value of an MR head is changed. This execution order is determined when a system is constructed, and it remains fixed. Therefore, if recovery routines which can actually recover an error exist near the end of the error recovery procedure including a plurality of routines, then wasteful recovery steps and reread operations will be repeatedly executed. This will result in a reduction in the efficiency of the error recovery procedure.

SUMMARY OF THE INVENTION

An objective of the present invention is to provide an apparatus and method to more efficiently execute an error recovery procedure in a data storage device.

According to the present invention, the routines registered in an error recovery procedure are divided into groups, and specific routines are selected from the groups in accordance with error types. The selected routines are executed in order. For this purpose, a storage device of the present invention comprises: a storage medium; a transducer for writing a signal to the storage medium or reading a signal from the storage medium; a means for storing an error recovery procedure (ERP) which includes a plurality of error recovery routines; and a unit for executing at least one of error recovery routines when an error occurs as the signal is written to or read from the storage medium. The plurality of error recovery routines of the error recovery procedure are divided into a plurality of groups each having at least one routine, and the unit for executing the error recovery routines executes at least one routine selected from each group in sequence for each group.

BRIEF DESCRIPTION OF THE DRAWINGS

FIG. 2 is a diagram used to explain an ERP table which is used for the error recovery procedure of the disk drive unit according to an embodiment of the present invention;

FIG. 4 is a diagram used to explain the set conditions of address offset values which are used for the error recovery procedure of the disk drive unit according to an embodiment of the present invention.

DESCRIPTION OF THE PREFERRED EMBODIMENT

Figure 1:
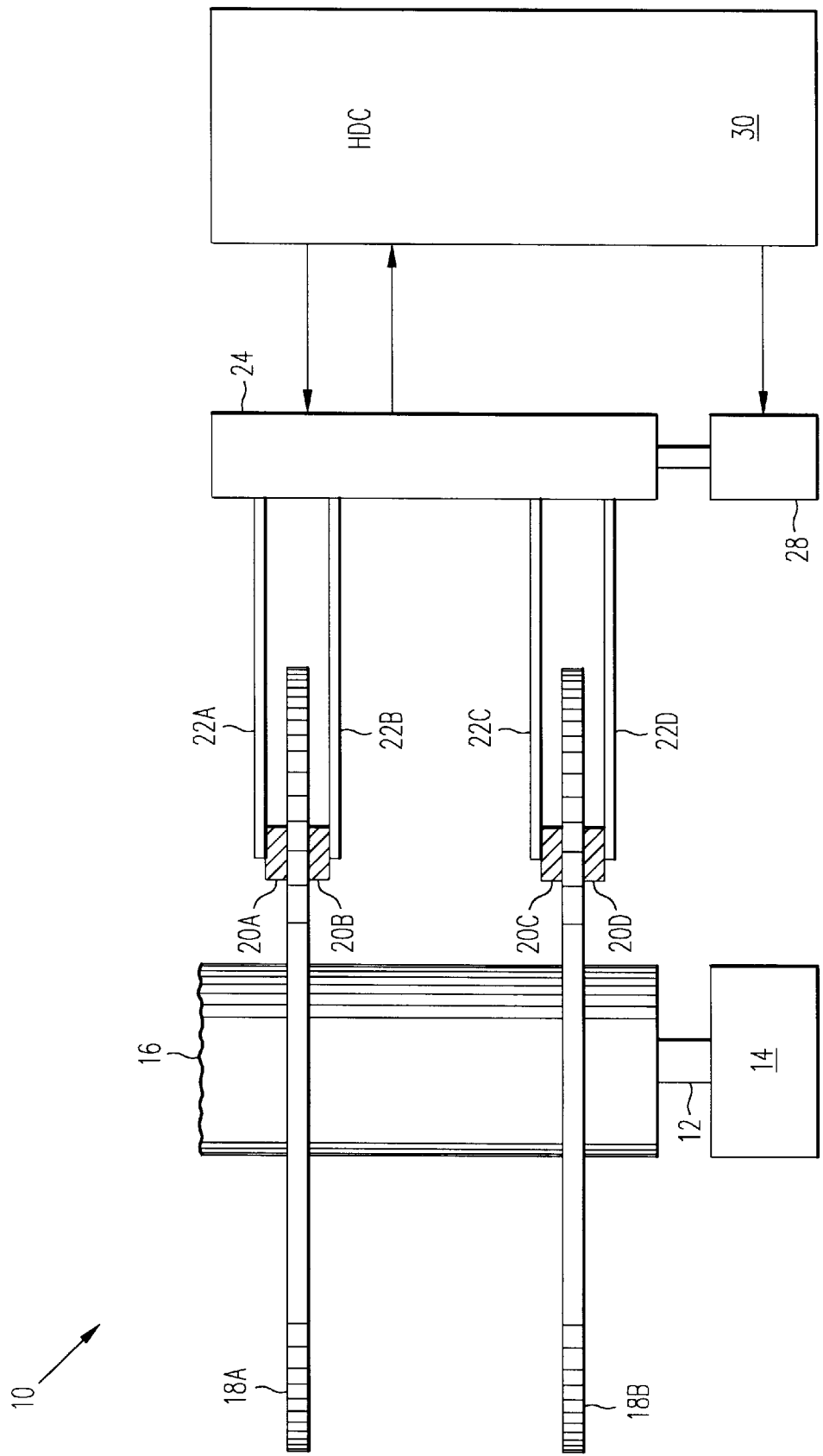
FIG. 1 is a schematic diagram of a disk drive unit according to an embodiment of the present invention.

FIG. 1 shows an example of a hard-disk drive (HDD) to which the present invention is applied. As shown in FIG. 1, the hard-disk drive 10 is constituted by a disk section and a hard-disk controller (HDC) 30 equipped with a local central processing unit (CPU). The disk section is equipped with a disk drive motor 14 which is used to spin a spindle 12 at high speed. A cylindrical support body 16 is mounted on the spindle 12 so that the center axis of the support body 16 and the center axis of the spindle 12 are aligned with each other. On the outer peripheral surface of the support body 16, information recording disks 18A and 18B are at a predetermined interval. If the spindle 12 is rotated by the disk drive motor 14, the disks 18A and 18B are rotated integrally with the support body 16.

Signal converters 20A, 20B, 20C, and 20D are supported and disposed by access arms 22A, 22B, 22C, and 22D so that each converter is opposed to the corresponding disk surface. The access arms 22A through 22D are attached to a converter drive motor 28 through a support member 24 and a spindle 26. If the drive motor 28 is rotated, each of the signal converters 20A through 20D is positioned at a predetermined position on the disk. The disk drive motor 14 and the converter drive motor 28 are connected to the HDC 30 so that the number of rotations or speed can be controlled. The HDC 30 is connectable to a host.

Data tracks are concentrically formed on a magnetic disk such as a magnetic hard disk. The reading or writing of information with respect to a magnetic disk is performed after a seek operation where the magnetic disk is rotated and where also the magnetic head is moved along the diameter direction of the magnetic disk so that it is positioned over a specific data track. An operation of positioning the magnetic head over a specific data track is performed by reading out the head position identification information recorded on the magnetic disk previously.

One of the causes of information reading failure which occurs on magnetic disks is data loss. It is known that the data loss is mainly caused by the damages such as scratches which occurred on disks with the passage of time and a specular change in magnetic material. When information is read out from a disk, standard reading conditions have usually been determined between a disk, a magnetic head, and a hard-disk controller. These reading conditions are (1) setting of an off-track quantity, which is an offset quantity between the center of the magnetic head and the center of the track, to a predetermined value, (2) setting of a bias current value, given to an MR element in the case where a magnetic head is equipped with the MR element, to a predetermined value, (3) making of a signal amplification factor variable by automatic gain control (AGC) for making the amplitude of a reconstruction signal constant, (4) making of a speed of a phase-locked loop (PLL) circuit, for stabilizing a sampling frequency, constant (a follow-up speed is set to a predetermined speed), etc.

According to these predetermined reading conditions, data reading is performed. When errors occur, data reading is again executed to recover errors by intentionally reducing a follow-up speed or holding the amplification factor of automatic gain control (AGC) for signal amplification constant.

In the present invention the order of each error recovery routine in the aforementioned error recovery procedure including a plurality of error recovery routines for error recovery is changed according to recognized error types, thereby achieving error recovery in the early stages of the error recovery procedure.

The error recovery procedure (ERP) includes, for example, an AGC holding routine, an off-track reading routine, and a servo-region skipping routine, as routines which can be processed in a short time. The error recovery procedure also includes a butterfly seeking routine and a low-rotation burnishing routine, as routines which take a relatively long time. The butterfly seeking routine is a routine of positioning a magnetic head over a target track again by iterating a seek operation several times in the vicinity of a track in which an error occurred. The low RPM (Round Per Minute) rotation burnishing routine is lowering the fly height of a head to remove the asperities and dust particles on a disk with the lowered magnetic head, and achieving error recovery.

In the present invention, various error recovery routines are divided into groups. An example of the routines of the error recovery procedure (ERP) divided into groups is shown in FIG. 2. In an ERP table shown in FIG. 2, the error recovery routines of the ERP to be executed are recorded in order and labeled as "steps." Steps 1 through 4 in the ERP table are pointers to routines which are executed for every error type. Step 5 and steps thereafter are grouped for selectively executing the routines in accordance with error types. In this example, each of the groups is constituted by three different error recovery routines. That is, each group includes three different routines: a routine for recovering a thermal asperity error, a routine for recovering a servo error, and a routine for recovering the other errors (misread errors).

Figure 3:
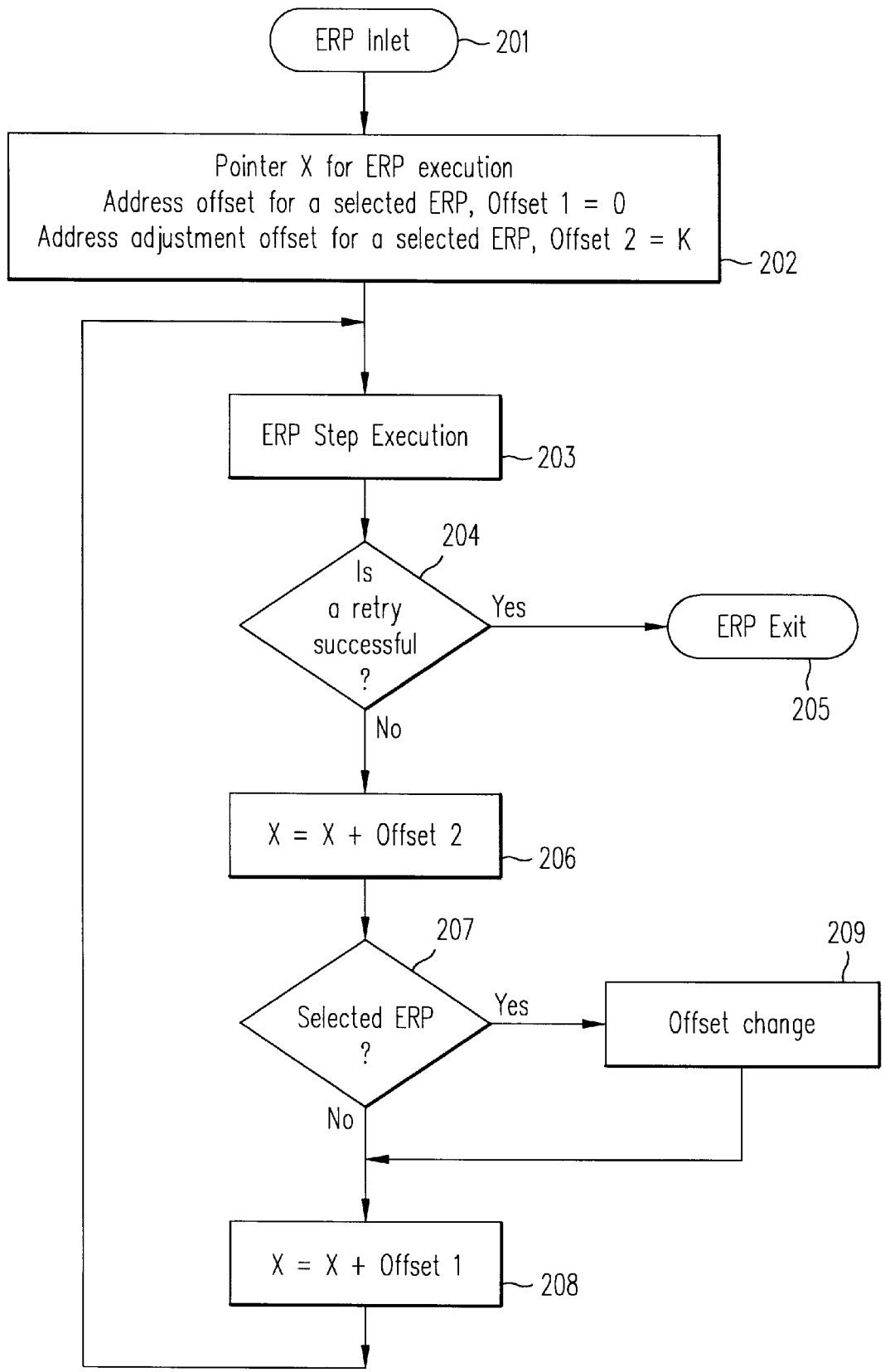
FIG. 3 is a flowchart used to explain the error recovery procedure in the disk drive unit according to an embodiment of the present invention.

The aforementioned routines of the error recovery procedure (ERP) are stored in a memory such as a ROM in a hard-disk controller. All or some of these routines may also be stored in a disk. In that case the routines are read out from the disk when the hard-disk drive unit is started, and then the routines are stored for execution in a memory such as a RAM. The hard-disk controller will select in sequence and execute a plurality of different routines when the error recovery procedure (ERP) is executed. FIG. 3 shows a flowchart of the ERP of the present invention. Initially, if the hard-disk controller receives an execution ERP instruction in step 201, the setting of ERP pointer X, address offset for a selected ERP (offset 1=0), and adjust offset for a selected ERP (offset 2=K) will be performed (step 202). The ERP pointer X is first set to the address in a memory of the first routine of the ERP. In the case of the example of FIG. 2, the address in a memory of a reading execution routine under a Sync-1 condition in step 1 (in this case 6E44) is set.

If the aforementioned setting ends, the first ERP routine will be executed in step 203. In the next step 204 a retry, that is, a verification of whether an error has been recovered or not is executed. If in step 204 the retry is successful, the ERP will advance to the exit of the ERP in step 205 and the ERP will end. If in step 204 the retry is unsuccessful, it will be meant that an error has not been removed and the ERP will advance to step 206 for executing ERP routines in sequence.

In step 206 the ERP execution address pointer X is updated. The pointer X is updated by X=X+offset 2 where the offset 2 is the offset 2 set in step 202 and equal to K. That is, the pointer X is updated by X=X+K. The K represents the number of requisite memory units for each address of each routine of the ERP in the address table.

Next, in step 207 it is judged whether the current position of the pointer has been set to the selected ERP. If the current position has been set to the selected ERP, step 207 will advance to step 209, in which a change in the offset will be executed. The offset change will be described later. If in step 207 the current position is not in a selected ERP, that is, if in the case of the example of FIG. 2 the pointer is in positions 1 through 4 of the table, step 207 will advance to step 208 and the pointer will be updated by X=X+offset 1. Before the change of the offset value is performed in step 209, the offset 1=0 which has been set in step 202 is used and the pointer X is X=X+0. The pointer does not move. Therefore, the ERP error recovery routine, indicated by the pointer set in step 206, is executed in step 203.

A description will be made of the offset change which is executed in step 209. If each step of the ERP advances and the pointer, set in step 206, gets into the selected ERP routine, the judgment in step 207 will be YES and step 207 will advance to step 209. In step 209 the offset 1 and the offset 2 are changed according to the error types discriminated by the hard-disk controller. In FIG. 4 there are shown examples of error types and the values of the offsets which are changed according to the error types. For example, when an error is a thermal asperity (TA) error, offset 1=0 and offset 2=3K are set.

If the updating of the offset value in step 209 ends, step 209 will advance to step 208. In step 208, with the value of the updated offset 1, the pointer X is updated and X=X+offset 1 is executed. In the case where the offset 1=K and offset 2=2k for a defective servo error are set in step 209, the pointer X in step 208 is updated to X=X+K. In this case, the error recovery routine indicated by the updated pointer is executed in step 203. Furthermore, if the retry in step 204 is unsuccessful, the updating of the pointer in step 206, that is, X=X+offset 2 becomes X=X+2K.

Thus, the offset value is set to a different value, depending upon error types. Therefore, error recovery routines which are compatible with respective error types are selected from each group of the ERP table and are executed in sequence. For example, in FIG. 2, when an error is a TA error, routines 1, 2, 3, 4, 5, 8, and 11 are executed in this order. In the case of a servo error, routines 1, 2, 3, 4, 6, 9, and 12 are executed in this order. In the case of a misread error, routines 1, 2, 3, 4, 7, 10, and 13 are executed in this order.

Figure 5:
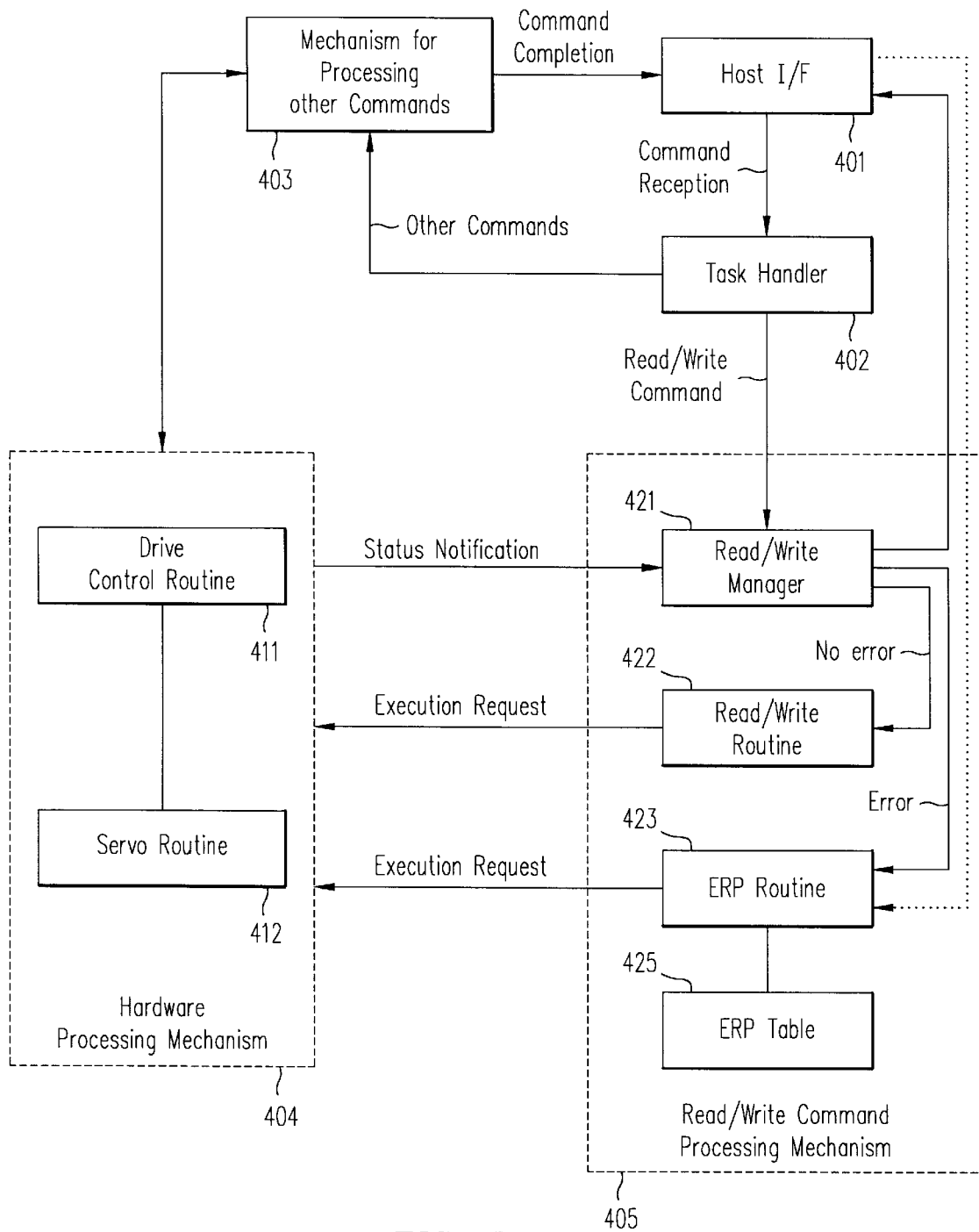
FIG. 5 is a block diagram of a system which processes the error recovery procedure of the disk drive unit according to an embodiment of the present invention.

In FIG. 5 there is shown a block diagram of a system which processes the error recovery procedure and the change in the execution order of the procedure. If a host I/F 401 which communicates with a host system receives a command from the host system, the command will be notified to a task handler 402. The task handler 402 discriminates a read/write command from the other commands by command types, and sends the read command to a mechanism 405 for processing the read command and also sends the other commands to a mechanism 403 for processing the other commands.

A hardware processing mechanism 404 is a mechanism which administrates hardware, and has a drive control routine 411 which controls a hard-disk controller and read/write channels and a servo routine 412 which controls a servo system.

The data reading/writing which is performed by the hard-disk drive (HDD) requires the following operations: (a) Interpret a command and know the physical position of data to be read or written; (b) seek operation, i.e. position the actuator at this physical position; (c) Read or write data; (d) When a track ends while blocks of data are being read or written, the next track is sought and the remaining blocks of data are read from or written to the next track. The read/write processing mechanism processes commands from the task handler 402 while taking these status into account.

A read/write manager 421 is a routine which judges the present status to control which routine is next executed. A read/write routine 422 is a routine which controls an actual execution of the execution routine determined by the read/write manager 421, and sends the hardware processing mechanism 404 an actual operation execution request corresponding to the execution routine. By this operation execution request, an actual operation is executed and the result is notified to the read/write manager 421 as status notification. If the read/write manager 421 is informed that the processing has ended in an error-free state, the read/write manager 421 will execute the next operation. When the processing of a command is completed, the host system will be notified of the result via the host I/F 401.

If an error occurs during a sequence of routines, then the read/write manager 421 will execute the error recovery procedure (ERP) routine 423. The ERP routine 423 is informed by the read/write manager 421 of the place at which an error occurred, and executes a predetermined error recovery procedure at that place. If the error is recovered, the ERP routine 423 will return to a normal processing operation.

According to the disk drive unit and the error recovery method of the present invention, various routines included in the error recovery procedure can be efficiently executed and it becomes possible to enhance reliability of error recovery.

We claim:

1. A storage device comprising:

a storage medium;

a transducer for writing a signal to said storage medium or reading a signal from said storage medium;

error recovery mechanism having a plurality of error recovery routines divided into a plurality of groups each having at least one routine; and a command processing mechanism which sequentially executes a plurality of error routines applicable to all error types then selectively executes at least one of said error recovery routines from each group based on an error type by setting a first offset value to a predetermined value for the error type corresponding to the error; and adjusting a pointer into a table of addresses by the first offset value to select and execute a first error routine corresponding to the type of error.

2. The storage device as set forth in claim 1, wherein the command processing mechanism selects the error recovery routines to be executed from each group from a table of addresses and skips over at least one of the error recovery routines by varying an offset value used to find the address of the error recovery routines to be executed.

3. The storage device as set forth in claim 1, wherein the command processing mechanism selects the plurality of error routines applicable to all error types in a first group from a table of addresses.

4. The storage device as set forth in claim 1, wherein the command processing mechanism includes a list of error types which correspond to each group of error recovery routines.

5. The storage device as set forth in claim 4, wherein there are at least four groups of error recovery routines including routines for data threshold adjustment, servo threshold adjustment, butterfly seek, MR head bias change, and fly height change.

6. The storage device as set forth in claim 5, wherein data threshold adjustment and servo threshold adjustment are in a first group, butterfly seek is in a second group, and fly height change is in a third group.

7. The storage device as set forth in claim 1 further comprising:

a host interface unit; and a task handler which receives commands from a host command processing mechanism and selectively passes read and write commands to the command processing mechanism.

8. A method of operating a storage device comprising the steps of:

reading a signal from a storage medium;

determining whether an error occurred in the reading step;

responsive to an error occurring, selecting and executing sequentially a plurality of error routines applicable to all error types, then setting first offset value to a predetermined value for an error type corresponding to the error; and adjusting a pointer into a table of addresses by the first offset value to select and execute a first error routine corresponding to the type of error.

9. The method of claim 8 further comprising the step of executing a second error routine corresponding to the type of error selected using a second offset value set to a second predetermined value corresponding to the error type.

10. The method of claim 9 wherein addresses for the plurality of error routines applicable to all error types are in a first group in the table of addresses.

11. The method of claim 10 wherein the error routines include routines for data threshold adjustment, servo threshold adjustment, butterfly seek, MR head bias change, and fly height change.

12. The method of claim 11 wherein the routines for data threshold adjustment and servo threshold adjustment are in a second group of addresses in the table, the routine for butterfly seek is in a third group of addresses in the table, and the routine for fly height change is in a fourth group of addresses in the table.

* * * * *